United States Patent [19]

Illing

[11] 3,971,414
[45] July 27, 1976

[54] SERVO BUTTERFLY VALVE AND VANE
[75] Inventor: Henry Illing, Parksville, N.Y.
[73] Assignee: Kieley & Mueller, Inc., Middletown, N.Y.
[22] Filed: Apr. 2, 1974
[21] Appl. No.: 457,266

[52] U.S. Cl. .............................. 137/630.15; 251/305
[51] Int. Cl.² ........................................ F16K 1/22
[58] Field of Search ................. 251/305, 1, 179, 11, 251/212; 137/601, 599, 599.2, 614.11, 630.15

[56] References Cited
UNITED STATES PATENTS

| | | | |
|---|---|---|---|
| 1,014,328 | 1/1912 | Podlesak | 137/601 X |
| 1,568,410 | 1/1926 | Minter | 251/305 X |
| 1,852,918 | 4/1932 | Chandler et al. | 251/305 X |
| 2,271,390 | 1/1942 | Dodson | 251/305 X |
| 2,796,082 | 6/1957 | Green et al. | 251/25 X |
| 3,070,345 | 12/1962 | Knecht | 251/305 X |
| 3,147,768 | 9/1964 | Kennedy | 137/601 X |

FOREIGN PATENTS OR APPLICATIONS

| | | | |
|---|---|---|---|
| 931,670 | 7/1946 | France | 251/305 |
| 345,774 | 5/1960 | Switzerland | 251/305 |

Primary Examiner—Martin P. Schwadron
Assistant Examiner—Robert J. Miller
Attorney, Agent, or Firm—Kenyon & Kenyon Reilly Carr & Chapin

[57] ABSTRACT

The butterfly valve vane is constructed with a main vane portion and a movable servo tab. The servo tab is controlled to open relative to the main vane portion in order to define an auxiliary flow path so that the flow forces acting on the vane create a substantially zero closing moment. The servo tab can be moved by a linkage means integrally connected with the control shaft on which the vane is mounted or can be moved by a separate actuator.

16 Claims, 9 Drawing Figures

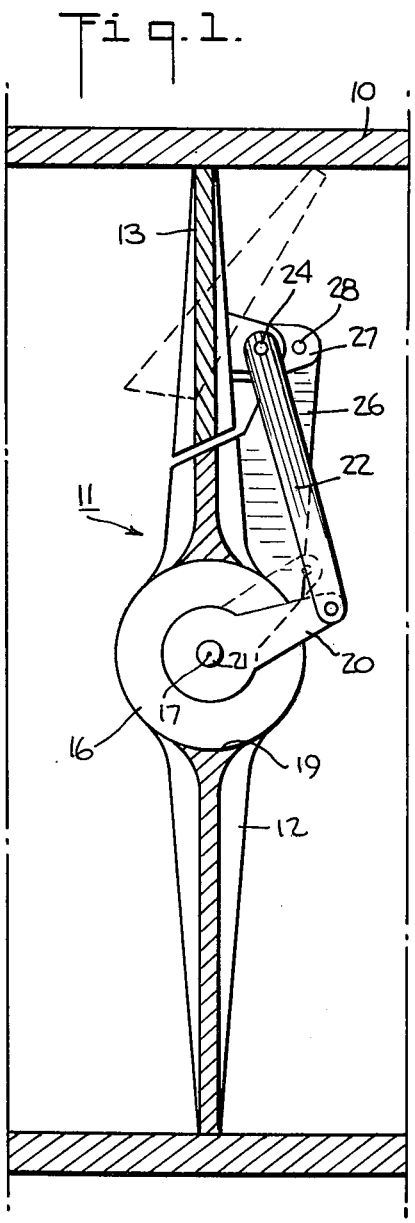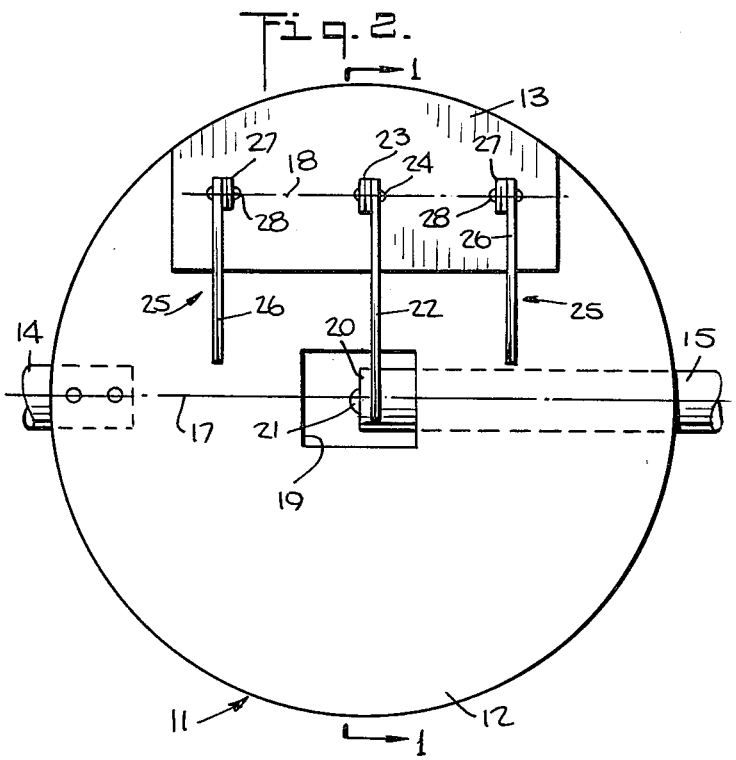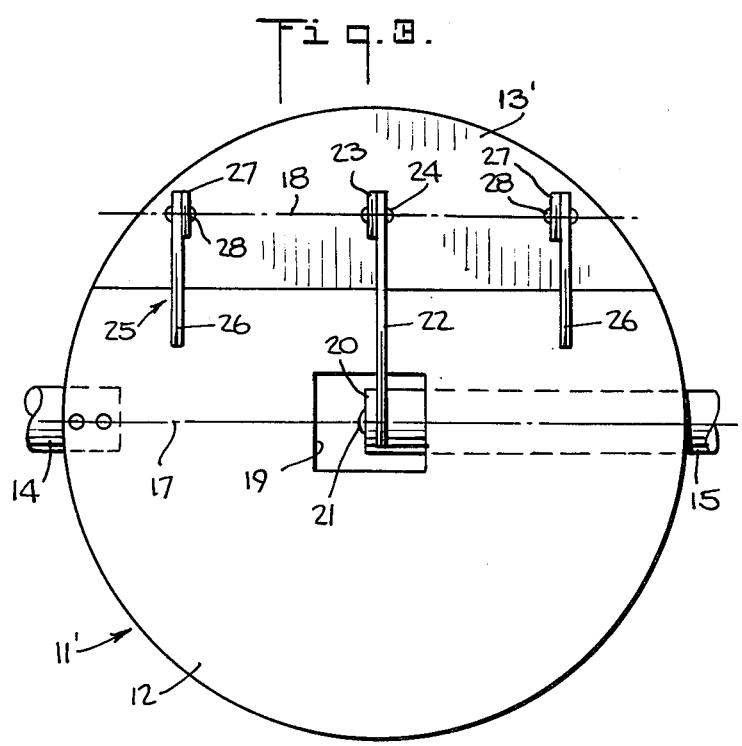

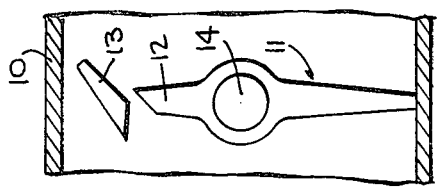
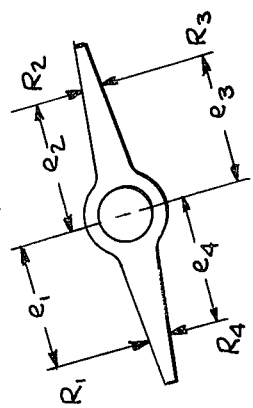
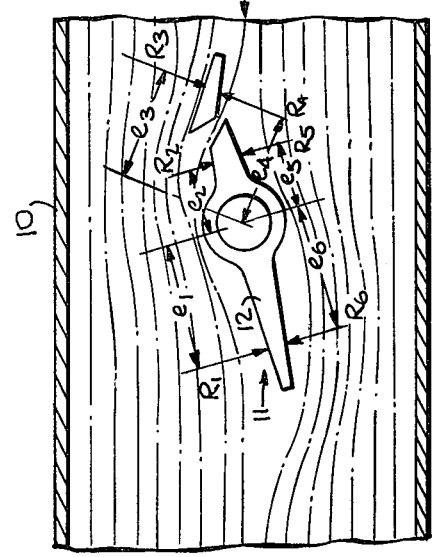
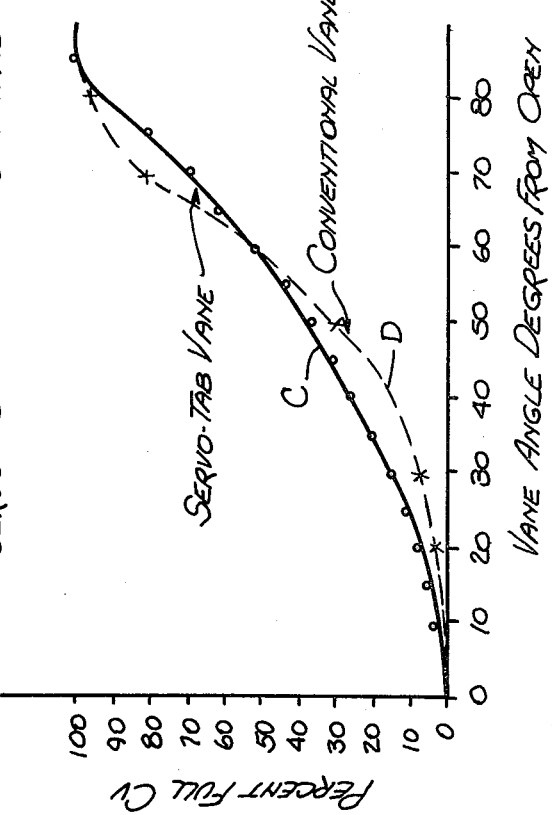
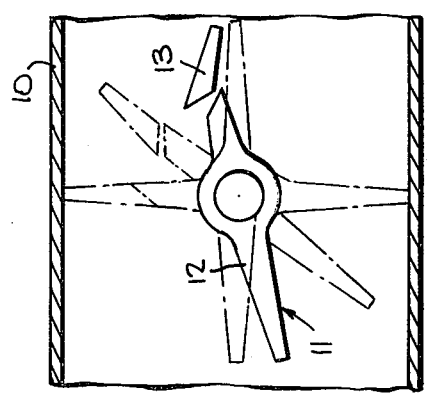
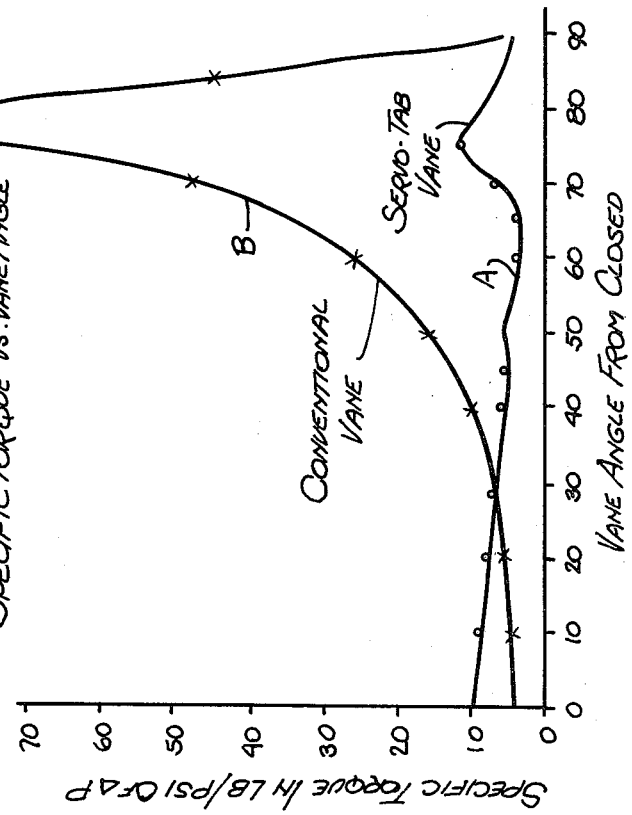

SERVO BUTTERFLY VALVE AND VANE

This invention relates to a butterfly valve and vane and to a method of reducing dynamic torque. This invention further relates to a method of increasing the turndown ratio of a butterfly valve.

Heretofore, various techniques have been known for reducing the dynamic torque on a butterfly vane of a butterfly valve when the valve is in a fully or partially open position. In many instances, the techniques have relied upon the use of camber shapes for the vane, fences on the tail end of the vane and offsetting of the shaft of the vane. In general, all of these methods only achieve a 50% or less reduction in dynamic torque.

It has also been known that various butterfly valves experience a sharp torque gradient reversal at an opening angle beyond 60°. As a result, the throttling capacity of these valves has been limited in order to avoid instability beyond an opening angle of 60°.

Generally speaking, the turndown ratio, sometimes called rangeability, which is the ratio of the maximum $C_v$ divided by the minimum controllable $C_v$, has generally been of limited value in the known butterfly valves. As is known, as the valve size increases, the minimum controllable $C_v$ necessarily increases. Thus, the turndown ratio decreases with increasing valve size.

Accordingly, it is an object of the invention to reduce the dynamic torque on a butterfly valve.

It is another object of the invention to reduce the sharp torque gradient reversals with attendant instability that plagues existing butterfly valves.

It is a further object of the invention to increase the turndown ratio from the present 50 to 1 to more than 100 to 1.

It is another object of the invention to increase the capacity of a butterfly valve to throttle by eliminating the need to limit the valve angle to 60°.

It is another object of the invention to allow 90° throttling within a butterfly valve.

Briefly, the invention provides a means of decreasing dynamic torque in a butterfly valve by forming an auxiliary flow path through the plane of a butterfly vane of the valve during movement of the vane from a closed position to an open position. The auxiliary flow path is maintained during movement of the vane from the closed position towards the open position at a size sufficient to produce a closing moment on the vane approximating a value of zero. Before reaching the fully open position, which is 90° from the closed position, the auxiliary flow path is eliminated to present a smooth profile to the flow.

The butterfly valve genrlly comprises a pipeline defing a flow path and a butterfly vane in the pipeline for selectively opening and closing the flow path. The butterfly vane includes a main vane portion and a servo tab which is movably mounted with respect to the main vane portion to define an auxiliary flow path between the main portion and the servo tab. In addition, the valve is provided with a means for moving the servo tab relative to the main vane portion.

Basically, the servo tab consists of a section of the vane that is hinged in a position to give a partially balanced control surface. This control surface is actuated by either of an integral means or a separate means so as to cancel the dynamic closing forces on the vane.

The servo tab may be located in any one of four quadrants of the valve, that is, anywhere in the 360° of possible vane travel although one quadrant may give better performance than the other three. When the servo tab and main vane portion are closed on each other, a solid continuous disc-like appearance is effected similar to a conventional butterfly vane.

In one embodiment, the servo tab can be a partial segment of the vane while, in another embodiment, the servo tab constitutes a total segment of the vane. In either case, the servo tab may be hinged or made movable in any suitable fashion relative to the main vane portion.

In one embodiment, the means for moving the servo tab includes a linkage integrally connected between a control shaft on which the vane portion is mounted and the servo tab in order to move the tab during movement of the main vane portion. In this embodiment, the main vane portion is adapted to pivot about a longitudinal axis coincident with the axis of the control shaft while the servo tab is oriented to pivot about an axis spaced from and parallel to the longitudinal axis of the main vane portion. The linkage means includes an eccentric secured to the control shaft, a lever pivotally mounted to one end of the eccentric, a link plate secured to the servo tab and pivotally secured to the lever and hinge means securing the servo tab to the main vane portion. As relative motion takes place, the eccentric causes the servo tab to pivot relative to the main vane portion via the lever and link plate.

In another embodiment, the control shaft is not fixed but is driven by separate motor actuator. In this embodiment, the servo tab can be used as a control surface for controlling the attitude (vane angle) of the main vane portion. The servo tab then supplies an opening or closing force to the main vane portion. Thus, the only actuation force required is that needed for tilting the balanced servo tab. In addition, this technique allows a high turndown to be achieved. By scheduling the opening of the servo tab before actuation of the main vane portion, a reduced trim characteristic is available near the closed position of the main vane portion. In this case, the servo tab is opened through an angle of 5° to 45° under a balanced force condition while the main vane portion remains in a closed position.

By using the servo tab for modulation with the main vane portion closed, a small valve size is affected. Therefore, the minimum controllable $C_v$ is proportionally less while the maximum $C_v$ of the valve remains close to the conventional butterfly $C_v$.

It has been found that the curve of the torque verses the vane angle of the servo tab butterfly valve peaks at about 75° at about 12 inch-pounds. For the same vane opening on a conventional butterfly vane, the torque peaks at 80 inch-pounds. By thus eliminating a high dynamic torque, the butterfly valve can be used for higher pressure drops than otherwise permitted. Thus, the butterfly valve may have substantial application for large valves, notably in water treatment equipment.

In addition, the capacity verses vane angle flow characteristic of the servo tab butterfly valve is such as to make the valve more manageable as a control device than a conventional butterfly valve vane.

These and other objects and advantages of the invention will become more apparent from the following detailed description and appended claims taken in conjunction with the accompanying drawings in which:

FIG. 1 illustrates a side view of a butterfly valve vane according to the invention when placed in a pipeline;

FIG. 2 illustrates a front view of the vane of FIG. 1;

FIG. 3 illustrates a modified embodiment of the vane having a total segment acting as a servo tab;

FIG. 4 illustrates the motion of the butterfly valve vane according to the invention;

FIG. 5 illustrates a force diagram of a servo tab butterfly valve vane;

FIG. 6 schematically illustrates a force diagram for a standard vane;

FIG. 7 illustrates a position of the vane of the invention for reduced trim operation;

FIG. 8 graphically illustrates the specific torque verses the vane angle of a servo tab vane according to the invention and a conventional vane; and FIG. 9 illustrates a comparison of characteristics of a servo tab vane of the invention and a conventional vane.

Referring to FIG. 1, the butterfly valve includes a pipeline 10 which defines a flow path for a flow of fluid or a gas. In addition, the valve includes a vane 11 which is mounted to selectively open and close the flow path of the pipeline 10. The vane 11 is movable from a closed position as shown to an opened position spaced 90° from the closed position. For these conditions, the vane 11 is substantially the same as a conventional solid disc butterfly vane in defining a disc of circular shape and is used in the same manner.

Referring to FIGS. 1 and 2, the butterfly vane 11 is constructed with a main vane portion 12 and a servo tab 13 which defines a partial segment of the vane 11. The term "partial segment" means a segment which is recessed within the main vane portion 12. As shown, the servotab 13 extends to a peripheral edge of the vane 11. The vane 11 is secured on a drive shaft 14 on one side and rotatably mounted on a fixed control shaft 15 on a diametrically opposite side. Both the drive shaft 14 and control shaft 15 project into a conventional enlarged boss 16 of the vane 11 and are located on a longitudinal axis 17 of the vane 11.

The main vane portion 12 is pivotal about the longitudinal axis 17 under the influence of the drive shaft 14 while the servo tab 13 is pivotally mounted about an axis 18 spaced from and in parallel to the longitudinal axis 17 to move from a closed position in the plane of the main vane portion 12 toward an open position relative to the main vane portion 12.

A means such as a linkage means is also provided for moving the servo tab 13 relative to the main vane portion 12. As shown, the main vane portion 12 is provided with a central aperture 19 into which a terminal end of the control shaft 15 projects. The linkage means includes an eccentric 20 secured to the terminal end of the control shaft 15 by means of a lock screw 21 or the like, a lever 22 which is pivotally connected to the free end of the eccentric 20 and a link plate 23 which is fixedly secured to the servo tab 13 and pivotally connected to the lever 22 by a pin 24. The link plate 13 is mounted symmetrically of the servo tab 13. In addition, the linkage means includes a pair of hinges 25 formed of support brackets 26 secured to the main vane portion 12, links 27 secured on the servo tab 13 and pivot pins 28 pivotally connecting the brackets 26 and links 27 together. As shown in FIG. 1, the pivot pins 28 in the brackets 26 are outside, i.e. to the right, of the pin 24 in the plate 23. This allows the servo tab 13 to be brought into a closed position relative to the vane portion 12 for both the opened and closed positions of the vane 11.

The linkage means is arranged so that as relative rotation takes place between vane 11 and shaft 15, the servo tab 13 is caused to pivot about the axis 18 relative to the main vane portion 12. As shown in FIG. 4, from the closed position of the vane 11, the motion of the servo tab 13 relative to the main vane portion 12 is such as to effect a gradual opening of the servo tab 13 up to a maximum opening at about a 77½° opening and then a gradual closing in the 90° position, i.e. the fully open position. During this movement, the servo tab 13 effects a cancelling of the closing moments on the vane 11.

By having the servo tab 13 open with respect to the main vane portion 12, an auxiliary flow path is defined in the plane of the vane 11. Thus, instead of four forces being imposed on the vane as would be the case with a conventional butterfly vane (that is, resultant forces acting on opposite surfaces of the vane and on opposite sides of the control shaft) the forces act against six surfaces of the vane 11. This is more particularly shown in FIG. 5 in which the flow of fluid is from right to left. As shown, force $R_1$ acts on the downstream end of the vane portion 12 on the upper surface at a perpendicular distance $e_1$ from the longitudinal axis 17 of the vane 11. Force $R_2$ acts on the upstream side of the upper face of the main vane portion 12 at a distance $e_2$ from the longitudinal axis; force $R_3$ acts on the upper surface of the servo tab 13 at a perpendicular distance $e_3$ from the longitudinal axis 17; force $R_4$ acts on the underside of the servo tab 13 at a perpendicular distance $e_4$ from the longitudinal axis 17; force $R_5$ acts on the underside surface of the main vane portion 12 at a distance $e_5$ from the longitudinal axis; and force $R_6$ acts on the undersurface of the main vane portion 12 at a distance $e_6$ from the longitudinal axis 17. In the position shown, the total closing moment on the vane 11 is equal to the sum of the various moments of the various forces $R_1$ to $R_6$. The sum of the moments approximates the value of zero. The resultants $R_1$–$R_2$ are vectors and are shown in approximate proportion. For purposes of comparison, FIG. 6 illustrates the resultant vectors $R_1$–$R_4$ for a standard vane of the same size as the vane 11.

Referring to FIG. 3, wherein like reference characters indicate like parts as above, the servo tab 13' constitutes a total segment of the vane 11'. The term "total segment" means a segment which is not recessed within the main vane portion 12. The operation of this vane 11' is the same as described above.

Referring to FIG. 8, from tests it has been found that the specific torque verses vane angle curve for a butterfly valve wherein the vane 11 is of 6 inches in diameter (that is, a standard 6 inch butterfly valve) follows the curve A. The curve A is plotted against the specific torque in inch-pounds per pounds per square inch (psi) of pressure change verses the vane angle of opening from a closed position of the vane. Curve B represents similar values for a conventional butterfly valve vane of the same standard size without a servo tab. As shown, the conventional vane peaks at an opening angle of about 77° at 80 inch-pounds/psi of pressure change. The servo tab vane of the invention peaks at about 75% of vane opening at a value of about 12 inch-pounds/psi of pressure. The reversal of the torque gradient of curve A is relatively smooth as shown in FIG. 8 while the overall values of specific torque are in the range of about 5 to 10 inch-pounds. Thus, the vane 11 remains substantially stable throughout the total range of vane openings. As a result, the vane 11 can be used for throttling through a full 90° of opening.

Referring to FIG. 7, the means for moving the servo tab 13 relative to the main vane portion 12 can be independently connected to the servo tab 13. For example, the means may be in the form of the motor which actuates the tab 13 prior to movement of the main vane portion 12. Also, the control shaft 15 as shown in FIG. 2 can be independently rotated relative to the drive shaft 14 to cause movement of the servo tab to form an adjustable auxiliary flow path through the vane 11. By opening the servo tab 13 to an angle of 5° to 45° relative to the main vane portion 12 as indicated by the dotted line positions in FIG. 1, while the vane portion remains in the closed position, a reduced trim is effected during initial opening. This permits a large turndown. That is, by utilizing the servo tab 13 for modulation while the main vane portion 12 is closed, a small valve size is affected. Therefore, the minimum controllable $C_v$ is relatively small while the maximum $C_v$ of the valve remains close to that of the conventional butterfly valve $C_v$. The ratio of the maximum $C_v$ to the minimal controllable $C_v$ can therefore be in a range of 100 to 1, for example.

It is to be noted that during the opening of the servo tab 13 that there is a partial balance of the forces on the tab. This is useful where the tab is used as a control surface for controlling the attitude of the main vane portion.

Finally, referring to FIG. 9, a graph of the percent of full $C_v$ verses the vane angle in degrees from the open position is shown for a conventional vane and a servo tab vane of the invention. Curve C represents the characteristic of the servo tab vane 11 of the invention while curve D represents that of the conventional butterfly valve vane. As shown, the characteristic of the servo tab vane 11 approaches a straight line and as such is slightly more manageable than that of the conventional vane.

The invention thus provides a servo tab butterfly valve which can be simply constructed. Further, the linkage means for linking the servo tab 13 to the main vane portion 12 can be located on the downstream side of the vane 11 so as not to interfere with the flow past the vane 11. In any event, as illustrated in FIG. 5, the servotab 13, 13' is located on the leading edge of the vane 11, 11' relative to the flow in the flow path defined by the pipe line 10.

What is claimed is:

1. A butterfly valve comprising
a pipeline defining a flow path.
a butterfly vane movably mounted in said pipeline for selectively opening and closing the flow path, said butterfly vane including a main vane portion and a servo tab mounted on a leading edge of said vane relative to a flow in said flow path, said servo tab being movably mounted in said main vane portion with respect to said main vane portion to define a single auxiliary flow path passing through said vane between said main vane portion and said servo tab upon movement of said vane from a closed position towards an open position in said pipeline; and
means for moving said servo tab relative to said main vane portion.

2. A butterfly valve as set forth in claim 1 wherein said means includes a linkage integrally connected to said servo tab to move said servo tab relative to said main vane portion during movement of said main vane portion.

3. A butterfly valve as set forth in claim 1 wherein said means is directly connected to said servo tab to move said servo tab relative to said main vane portion while said main vane portion is immobile.

4. A butterfly valve as set forth in claim 1 wherein said servo tab constitutes a partial segment of said vane.

5. A butterfly valve as set forth in claim 1 wherein said servo tab constitutes a total segment of said vane.

6. In a butterfly vane including a main vane portion for pivoting about a longitudinal axis and a servo tab movably mounted on said main vane portion in one quadrant of said vane to define a single auxiliary flow path passing through said vane between said main vane portion and said servo tab, said servo tab extending to a peripheral edge of said vane.

7. In a butterfly valve as set forth in claim 6, means for moving said servo tab relative to said main vane portion.

8. In a butterfly valve, a butterfly vane including a main vane portion for pivoting about a longitudinal axis passing through said main vane portion and a servo tab pivotally mounted on said main vane portion on and about an axis located outside said butterfly vane and spaced from and parallel to said longitudinal axis to move from a closed position relative to said main vane portion towards an open position relative to said main vane portion to define an auxiliary flow path through said vane between said main vane portion and said servo tab.

9. In a butterfly valve as set forth in claim 8, a control shaft on said longitudinal axis for pivoting said main vane portion and linkage means connected between said control shaft and said servo tab for moving said servo tab relative to said main vane portion during pivoting of said main vane portion.

10. In a butterfly valve as set forth in claim 9 wherein said servo tab is pivotably movable relative to said main vane portion up to an angle of 45 degrees.

11. In a butterfly valve as set forth in claim 9 wherein said linkage means is articulated to move said servo tab from said closed position relative to said main vane portion through a variably open position relative to said main vane portion to a closed position relative to said main vane portion during movement of said vane from a closed position to an open position disposed 90° from said closed position.

12. In a butterfly valve as set forth in claim 11 wherein said variably open position is a maximum at a position of 77½° of said vane from said closed position thereof.

13. A butterfly vane including a main vane portion and a servo tab, said servo tab being movably mounted on said main vane portion to define a single auxiliary flow path passing through said vane between said main vane portion and said servo tab upon movement of said servo tab relative to said main vane portion, said servo tab extending to a peripheral edge of said vane.

14. A butterfly vane as set forth in claim 13 further including a linkage means connected to said servo tab for moving said servo tab relative to said main vane portion during movement of said main vane portion.

15. A butterfly valve comprising
a pipeline defining a flow path;
a drive shaft;

a butterfly vane movably mounted in said pipeline for selectively opening and closing the flow path, said butterfly vane including a main vane portion secured on said drive shaft and a servo tab movably mounted in said main vane portion with respect to said main vane portion to define an auxiliary flow path passing through said vane between said main vane portion and said servo tab; and means including linkage means articulated to said servo tab to move said servo tab relative to said main vane portion during rotation of said drive shaft and said main vane portion.

16. In a butterfly valve, a butterfly vane including a main vane portion for pivoting about a longitudial axis and a servo tab pivotally mounted on said main vane portion on an axis spaced from and parallel to said longitudinal axis;

a fixedly mounted control shaft mounted on said longitudinal axis for rotation of said main vane portion thereon;

a drive shaft mounted on said longitudinal axis and secured to said main vane portion for rotating said main vane portion on said control shaft; and a linkage means secured to said fixed control shaft and to said servo tab for pivoting said servo tab relative to said main vane portion upon rotation of said main vane portion on said control shaft to move said servo tab from a closed position relative to said main vane portion towards an open position relative to said main vane portion to define a flow path through said vane between said main vane portion and said servo tab.

* * * * *